United States Patent
Doujak

[11] Patent Number: 6,007,912
[45] Date of Patent: Dec. 28, 1999

[54] WIRE CORD FOR REINFORCING RUBBER ITEMS

[75] Inventor: Siegfried Doujak, Merzig, Germany

[73] Assignee: Drahtcord Saar GmbH & Co., Merzig, Germany

[21] Appl. No.: 09/043,503

[22] PCT Filed: Sep. 4, 1996

[86] PCT No.: PCT/EP96/03883

§ 371 Date: May 22, 1998

§ 102(e) Date: May 22, 1998

[87] PCT Pub. No.: WO97/12090

PCT Pub. Date: Apr. 3, 1997

[30] Foreign Application Priority Data

Sep. 25, 1995 [DE] Germany .................. 195 35 597

[51] Int. Cl.⁶ .................................................. B32B 15/00
[52] U.S. Cl. .................... 428/379; 428/373; 428/376; 428/397; 57/207; 152/451
[58] Field of Search .................................. 428/379, 373, 428/376, 397; 57/207; 152/451

[56] References Cited

U.S. PATENT DOCUMENTS 5,688,597  11/1997  Kohno ............................... 428/379

FOREIGN PATENT DOCUMENTS

| 900175 | 11/1984 | Belgium . |
| 2209752 | 9/1973 | Germany . |
| 2648524 | 5/1978 | Germany . |
| 3202642 | 9/1982 | Germany . |
| 4135599 | 5/1993 | Germany . |

*Primary Examiner*—Richard Weisberger
*Attorney, Agent, or Firm*—Stevens, Davis, Miller & Mosher, L.L.P.

[57] ABSTRACT

A wire cord for reinforcing rubber items, more particularly pneumatic tires for cars and trucks, comprises at least three wire filaments 2 arranged about a continuous core filament 3. The core filament 3 consists of a non-metallic material capable of longitudinal contraction when the rubber item 5 to be reinforced is vulcanized, this material being more particularly non-drawn nylon. On vulcanization of the rubber item 5 to be reinforced the core filament 3 contracts and expands in diameter.

16 Claims, 2 Drawing Sheets

WIRE CORD FOR REINFORCING RUBBER ITEMS

FIELD OF THE INVENTION

The invention relates to a wire cord for reinforcing rubber items, more particularly pneumatic tires, comprising at least three wire filaments arranged about a continuous core filament.

BACKGROUND OF THE INVENTION

Wire cords comprising at least three wire filaments arranged about a continuous core filament are known, they serving, more particularly, for reinforcing pneumatic tires such as, for example, car and truck tires. Such wire cord inserts in tires are known as belted cord inserts.

When employed in van and truck tires such wire cord inserts or strengthenings are subjected to higher stresses than when used in car tires, this being the reason why the demands on wire cords reinforcing truck tires being higher. Accordingly, when cheap-production steel cords having a simple configuration, as employed for example in car tires, are used in van and truck tires belt edge detachment may easily occur.

Such simply configured steel cords consist, for example, of a core composed of three wire filaments having a diameter of 0.2 mm as well as six 0.35 mm diameter wire filaments arranged about this core. Producing such a steel cord is simple and in general presents no problem in processing. As already mentioned, however, due to its stiffness, detachment of the belt edge may easily occur in the tire, making the tire useless.

This risk of the belt edge becoming detached is significantly diminished in the case of cords produced at more expense having a higher number of wires (for example steel cords having a core cord of three wire filaments wrapped by nine wire filaments and a sheathing ply of a further fifteen wire filaments each having a diameter of 0.22 mm as well as a spiral wire of 0.15 mm diameter surrounding this structure). However, due to the geometric assignment of the individual wires relative to each other inner cavities automatically materialize in the case of such wire cords having a higher wire number, it then no longer being possible for the embedding rubber to penetrate therein so that the adhesive bond of the embedding rubber remains limited to the outer casing sections. On top of this, moisture contained in the entrapped air has a corrosive effect on the wire cords from within and contributes towards the wires becoming prematurely aged and ruined.

Known from DE 26 48 524 A1 is a wire cord as a medium for strengthening rubber items which is configured of three or more solid metal wires twisted together about a continuous core of a non-metallic compressible material. More particularly this non-metallic compressible material is a vulcanizable rubber, a thermoplastic, an aromatic polyamide or a natural or man-made fiber material. By employing such a non-metallic compressible material as the core of a wire cord the vacant space otherwise existing in the wire cord is practically or substantially filled out, as a result of which displacements of individual outer wires under the influence of lateral compressive forces are avoided. Filling out the vacant spaces in the wire cord in this way is achieved by the elastomer or textile core yielding to the steel wires grouped about the core when the steel cord is processed in the tire so that the steel wires are able to approximate each other and slightly deform the core wire.

Known from DE-PS 816 308 is a reinforcing insert for items made of rubber, the wire cords of which comprise a non-vulcanized or prevulcanized rubber core in which the individual wires are located spaced away from each other. Due to these rubber cores the cords are endowed with a high elastic strain so that the wire cord features higher flexibility.

Known from DE-OS 2 209 752 are wire cords as reinforcing inserts in conveyor belts consisting, for example, of wire filaments arranged about an elastomer core.

SUMMARY OF THE INVENTION

As compared to the above the invention is based on the object of providing a wire cord of the aforementioned kind which is simple in configuration and thus cost-effective in production whilst, on the other hand, ensuring good anchorage and location of the wire cord edges in the rubber item to be reinforced with reduced risk of corrosion in the interior of the wire cord.

To achieve this object in accordance with the invention a wire cord is proposed for reinforcing rubber items, more particularly pneumatic tires, comprising at least three wire filaments arranged about a continuous core filament, the core filament consisting of a non-metallic material capable of longitudinal contraction when the rubber item to be reinforced is vulcanized. In vulcanization of such a wire cord configured in accordance with the invention longitudinal contraction of the core filament forming the core of the wire cord occurs, i.e. the core filament contracts in the longitudinal direction of the wire cord, as a result of which the core filament retracts from the cut edges of the wire cord so that a cavity defined by the wire filaments surrounding the core filament materializes there. During vulcanization the rubber blend is able to penetrate into this cavity as a result of which a particularly good anchorage of the wire cord in the rubber item to be reinforced is assured.

In one advantageous aspect of the invention the core filament consists of a non-drawn aliphatic polyamide, preferably of non-drawn nylon. Non-drawn aliphatic polyamide, more particularly, non-drawn nylon features the advantage that when the rubber item to be reinforced is vulcanized it shrinks not only longitudinally but also the diameter of the aliphatic polyamide simultaneously increases during the shrinkage process. Due to this increase in the diameter the polyamide penetrates into cavities existing between the wire filaments surrounding the core filament and practically fills the cavities out. When using non-drawn aliphatic polyamide, more particularly, non-drawn nylon as the core filament the wire cord in accordance with the invention thus offers, on the one hand, the advantage of better locating the wire cord cut edge in the rubber item to be reinforced since the rubber blend thereof is able to penetrate into cavities at the end of the wire cord created by the shrunk polyamide core whilst, on the other, the wire cord in accordance with the invention offers the advantage that the shrunk polyamide core retracts into the interior of the wire cord where it fills out the cavities between the individual wire filaments so that corrosion of the individual wires from the interior of the wire cord is avoided.

BRIEF DESCRIPTION OF THE DRAWINGS

The invention will now be explained by way of an example embodiment with respect to the drawing in which.

DETAILED DESCRIPTION OF THE PREFERRED EMBODIMENTS

Figure 1:
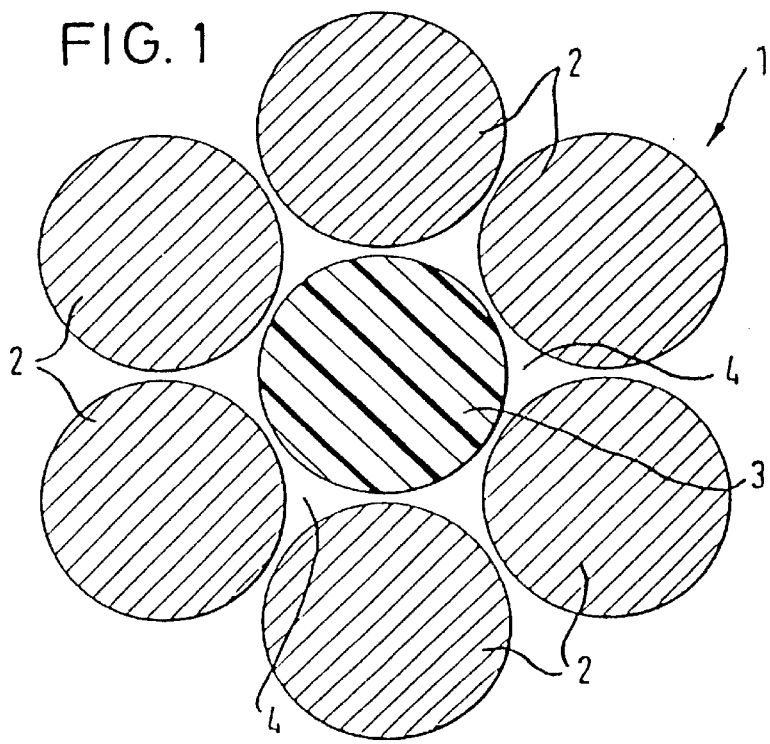
FIG. 1 is a schematic illustration of a cross-section through a wire cord in accordance with the invention for reinforcing rubber items prior to vulcanization of the rubber item to be reinforced.

Referring now to FIG. 1 there is illustrated schematically a cross-section through a wire cord 1 in accordance with the invention for reinforcing rubber items, more particularly, pneumatic tires. The wire cord 1 in accordance with the invention comprises a core filament 3, about which six wire filaments 2 are arranged symmetrically in parallel. In the example shown both the wire filaments 2 and the core filament 3 each have the same diameter.

The diameter of the wire filaments 2 and of the core filament 3 is selected as a function of the intended future employment of the wire cord, i.e. depending on the type and size of the tire to be reinforced. In the example embodiment illustrated the diameter may be, for example, 0.35 mm, however, also others diameters are possible. It will readily be appreciated, of course, that that wire cords may also be employed in which the wire filaments 2 and the core filament 3 differ in diameter.

Due to the circular cross-section of the wire filament 2 and of the core filament 3 a cavity 4 is formed in each case between two adjacent wire filaments 2 and the core filament 3.

In accordance with the invention the core filament 3 of the wire cord 1 as shown in FIG. 1 is made of a non-metallic material which is capable of contracting longitudinally in vulcanization of the rubber item to be reinforced. This property is made use of to create in the rubber item to be reinforced, more particularly a pneumatic tire, a firm anchorage of the wire cord. For this purpose the wire cord 1 as illustrated—after calandering and cutting the belt plies—is processed into a so-called green tire which is subsequently vulcanized. In vulcanization the core filament 3 contracts longitudinally, i.e. it shrinks in the direction of the longitudinal axis of the wire cord 1 towards its centerline (cf. FIG. 3), as a result of which cavities are created at the cut edges 6 of the wire cord 1 into which the vulcanization blend can penetrate, thus resulting in intermeshing of the wire cord, more particularly of its wire filaments 2 with the rubber item to be reinforced.

Figure 2:
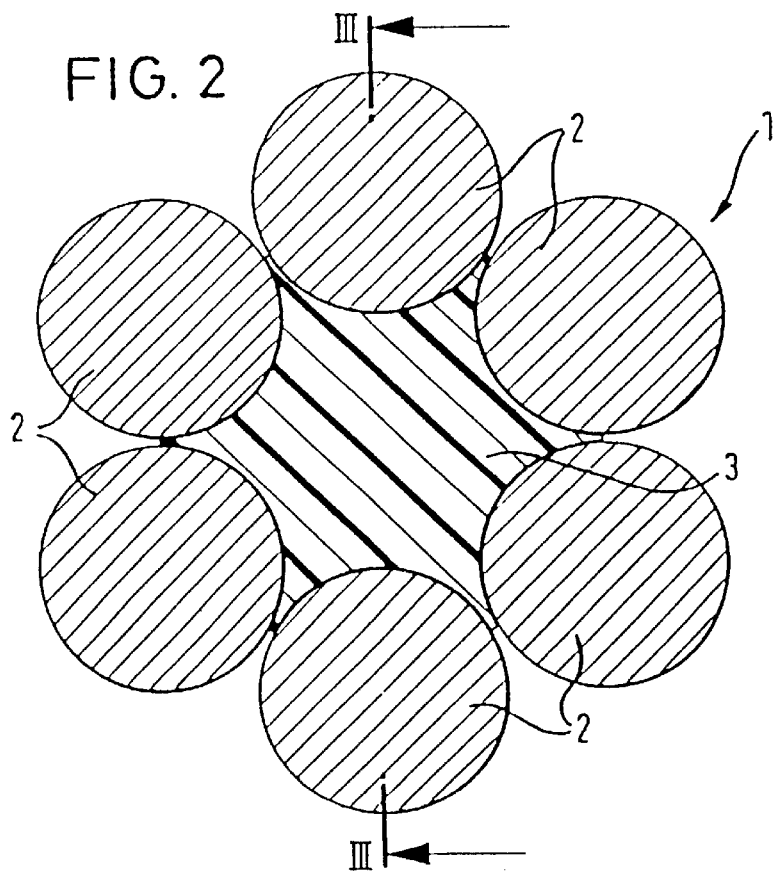
FIG. 2 is a schematic illustration of the wire cord in accordance with the invention as shown in FIG. 1 after vulcanization of the rubber item to be reinforced.

Referring now to FIG. 2 there is illustrated a section through the wire cord 1 in accordance with the invention as shown in FIG. 1 after vulcanization. Due to its shrinkage the core filament 3 has not only changed in length, its diameter has also increased at the same time. This results in the core filament 3 expanding into the cavities 4 as described above, practically filling them out. As evident from FIG. 2 the space enclosed by the circular arrangement of wire filaments 2 is practically filled out completely by the non-metallic material of the core filament 3 so that substantially cavities no longer exist therein.

Due to substantially the complete space enclosed by the wire filaments being filled out in accordance with the invention the risk of corrosion of the wire cord 1 from within due to entrapped moisture is greatly reduced.

Figure 3:
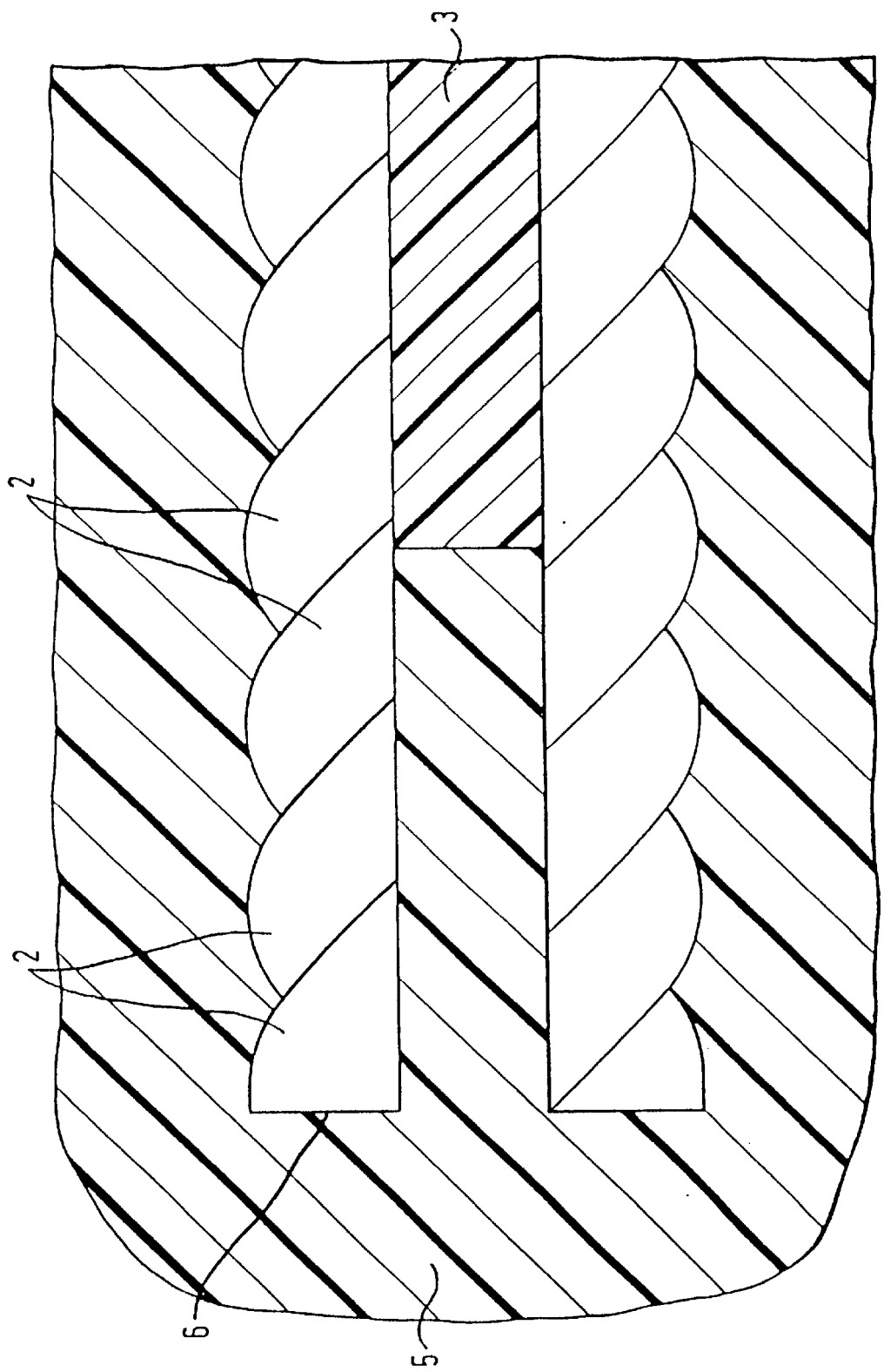
FIG. 3 is a schematic illustration of a section through the wire cord as shown in FIG. 2 after vulcanization of the rubber item to be reinforced as taken along the section line III—III.

Referring now to FIG. 3 there is illustrated schematically a section in the longitudinal direction through the wire cord in accordance with the invention as shown in FIG. 2 after vulcanization as viewed along the section line III—III. FIG. 3 shows the wire cord 1 in accordance with the invention in the embedded condition in the rubber item 5 to be reinforced. The rubber item 5, not shown in FIG. 2 to make for a better overview, is shown in section in FIG. 3. The rubber item 5 to be reinforced in this case is a pneumatic tire.

As evident from the longitudinal section of FIG. 3 the core filament 3 surrounded by the wire filaments 2 has contracted during vulcanization so that in the region of the cut edge 6 between the wire filaments 2 a cavity has materialized into which the rubber blend of the rubber item 5 to be reinforced has penetrated.

Due to this penetration in accordance with the invention an intermeshing of the wire cord, more particularly of the wire filaments 2 and the rubber item 5 to be reinforced is achieved in the region of the cut edge 6 so that a particularly good embedding and connection of the wire cord 1 in the rubber item 5 to be reinforced exists.

In accordance with the invention good location of the wire cord edge 6 in the rubber item 5 to be reinforced is achieved whilst reducing the risk of corrosion at the same time.

As the non-metallic material for the core filament 3 a non-drawn aliphatic polyamide, more particularly non-drawn nylon is particularly suitable. On vulcanization such a core filament 3 of a non-drawn nylon shrinks by approximately 5 to 7%, as a result of which a sufficiently large cavity materializes at the cut edge 6 of the wire cord 1 into which the rubber blend can penetrate where it is able to enter into a firm bond with the brass of the surface of the wire filaments 2.

I claim:

1. A wire cord for reinforcing rubber items, more particularly pneumatic tires, comprising at least three wire filaments (2) arranged about a continuous core filament (3) characterized in that said core filament (3) consists of a non-metallic material capable of longitudinal contraction when said rubber item (5) to be reinforced is vulcanized.

2. The wire cord as set forth in claim 1, wherein said core filament (3) consists essentially of a non-drawn aliphatic polyamide.

3. The wire cord as set forth in claim 2, wherein said core filament (3) consists essentially of non-drawn nylon.

4. The wire cord as set forth in claim 1, wherein said wire filaments (2) have the same diameter.

5. The wire cord as set forth in claim 1, wherein said wire filaments (2) and said core filament (3) have the same diameter prior to vulcanization of said rubber item (5) to be reinforced.

6. The wire cord as set forth in claim 1, wherein said core filament (3) consists of a non-drawn aliphatic polyamide.

7. The wire cord as set forth in claim 2, wherein said core filament (3) consists of non-drawn nylon.

8. The wire cord as set forth in claim 2, wherein said wire filaments (2) have the same diameter.

9. The wire cord as set forth in claim 3, wherein said wire filaments (2) have the same diameter.

10. The wire cord as set forth in claim 6, wherein said wire filaments (2) have the same diameter.

11. The wire cord as set forth in claim 7, wherein said wire filaments (2) have the same diameter.

12. The wire cord as set forth in claim 2, wherein said wire filaments (2) and said core filament (3) have the same diameter prior to vulcanization of said rubber item (5) to be reinforced.

13. The wire cord as set forth in claim 3, wherein said wire filaments (2) and said core filament (3) have the same diameter prior to vulcanization of said rubber item (5) to be reinforced.

14. The wire cord as set forth in claim 4, wherein said wire filaments (2) and said core filament (3) have the same diameter prior to vulcanization of said rubber item (5) to be reinforced.

15. The wire cord as set forth in claim 6, wherein said wire filaments (2) and said core filament (3) have the same diameter prior to vulcanization of said rubber item (5) to be reinforced.

16. The wire cord as set forth in claim 7, wherein said wire filaments (2) and said core filament (3) have the same diameter prior to vulcanization of said rubber item (5) to be reinforced.

* * * * *